United States Patent [19]
Scott

[11] Patent Number: 6,045,029
[45] Date of Patent: *Apr. 4, 2000

[54] EARTH-BORING BIT WITH IMPROVED RIGID FACE SEAL

[75] Inventor: Danny Eugene Scott, Montgomery, Tex.

[73] Assignee: Baker Hughes Incorporated, Houston, Tex.

[*] Notice: This patent issued on a continued prosecution application filed under 37 CFR 1.53(d), and is subject to the twenty year patent term provisions of 35 U.S.C. 154(a)(2).

[21] Appl. No.: 08/839,418

[22] Filed: Apr. 14, 1997

Related U.S. Application Data

[63] Continuation of application No. 08/620,639, Mar. 22, 1996, abandoned, which is a continuation-in-part of application No. 08/390,897, Feb. 15, 1995, abandoned, which is a continuation of application No. 08/048,863, Apr. 16, 1993, abandoned.

[51] Int. Cl.[7] .............................. B23K 31/02; F16J 15/34
[52] U.S. Cl. ...................... 228/122.1; 277/404; 156/60; 228/177; 427/528; 427/596
[58] Field of Search ............... 277/404; 156/60; 228/122.1, 262.31, 262.42, 177; 427/528, 525, 530, 562, 577, 582, 596, 561, 249

[56] References Cited

U.S. PATENT DOCUMENTS

| | | | |
|---|---|---|---|
| 4,729,440 | 3/1988 | Hall | 175/107 |
| 4,738,322 | 4/1988 | Hall et al. | 175/329 |
| 4,822,057 | 4/1989 | Chia et al. | 277/96.2 |
| 4,987,007 | 1/1991 | Wagal et al. | 427/53.1 |
| 5,098,737 | 3/1992 | Collins et al. | 427/53.1 |
| 5,108,813 | 4/1992 | Noda et al. | 428/141 |
| 5,264,071 | 11/1993 | Anthony et al. | 156/612 |
| 5,271,547 | 12/1993 | Carlson | 228/122.1 |
| 5,314,652 | 5/1994 | Simpson et al. | 264/81 |
| 5,349,922 | 9/1994 | Anthony et al. | 117/204 |

FOREIGN PATENT DOCUMENTS

| | | |
|---|---|---|
| 1261570 | 10/1989 | Japan . |
| 2192483 | 7/1990 | Japan . |
| 2-300569 | 12/1990 | Japan ................................ 277/96.2 |

OTHER PUBLICATIONS

Ito et al. (Idemitsu), Translation of Japanese reference 1–261570, Oct. 18, 1989.

F. Davanloo et al., "Mass Flow in Laser–Plasma Deposition of Carbon Under Oblique Angles of Incidence" Appl. Phys.A 54, 369–372 (1992).

F. Davanloo et al., "Adhesion and Mechanical Properties of Amrophic Diamond Films Prepared by a Laser Plasma Discharge Source" J. Appl. Phys., vol. 71, No. 3, 1446–1453 (Feb. 1992).

J. Stevefelt et al., "Modeling of a Laser Plasma Source of Amorphic Diamond", Appl. Phys. 24 (1991) 2149–2153.

C.B. Collins et al., "Microstructure of Amorphic Diamond Films" J. Appl. Phys. vol. 69, No. 11, pp. 7862–7870 (Jun. 1991).

F. Davanloo et al., "Laser Plasma Diamond", J. Mater, Res., vol. 5, No. 11, pp. 2398–2404 (Nov. 1990).

(List continued on next page.)

*Primary Examiner*—Daniel G. DePumpo
*Attorney, Agent, or Firm*—James E. Bradley

[57] ABSTRACT

An earth-boring bit has a bit body, at least one cantilevered bearing shaft, including a base and a cylindrical journal bearing surface extending inwardly and downwardly from the bit body, and at least one cutter mounted for rotation on the cylindrical journal bearing surface of the bearing shaft. A seal assembly is disposed between the cylindrical journal bearing surface and the cutter proximally to the base of the cantilevered bearing shaft. The seal assembly includes at least one rigid seal ring having a seal face in contact with a second seal face. At least one of the seal faces is at least partially formed of a super-hard material having wear-resistance greater than, and a coefficient of sliding friction less than, that of the rigid seal ring material.

14 Claims, 3 Drawing Sheets

OTHER PUBLICATIONS

S.S. Wagal et al., "Diamond–like Carbon Films Prepared With a Laser Ion Source", Appl. Phys. Lett., vol. 53, No. 3, pp. 187–188 (Jul. 1988).

Z. Feng et al., "Friction of Diamond on Diamond and Chemical Vapour Deposition Diamond Coatings", Surface and Coatings Technology, 47, pp. 631–635, (1991).

E.I. Tochitsky et al., "The Formation of Diamond–like Carbon Coatings for Raising the Wear Resistance of Precision Friction Pairs", Surface and Coatings Technology, 47, pp. 252–256 (1991).

I.I. Aksenov et al., "Wear Resistance of Diamond–like Carbon Coatings", Surface and Coatings Technology, 47, pp. 252–256 (1991)

S.D. Gorpinchenko et al., "Wear Resistance of Diamond–like Coatings", Surface and Coatings Technology, 47, pp. 201–208, (1991).

S. Alsenberg et al., "Ion Beam and Ion–Assisted Depostion of Diamond–like Carbon Films", Materials Science Forum vol. 52 & 53, pp. 1–40, (1989).

C.L. Spiro et al., "New Applications of CVD Diamond", GE Corporate and Development, pp. 18–39–18–49.

P. Craig, "Thin–Film Diamond Derby", Cutting Tool Engineering vol. 44, No. 1, (Feb. 1992).

C.B. Collins et al., "Microstructural Analyses of Amorphic Diamond, i–c, and Amorphous Carbon", Appl. Phys. No. 1, vol. 72, (1992).

"The Diamond Film Revolution", Welcome to the Diamellennium.

"Pure Diamond Available in Large Sizes", Materials Engineering, Circle 222, 6, (May 1992).

Product Brochure "Norton Introduces "White" CVD Diamond Wafers", Norton Company, pp. 1–4 (ca. 1991).

Product Brochure "Norton Diamond Film: Leading a New Technology into Commercial Applications", Norton Company, pp. 1–4 (ca. 1991).

H. Schmidt, "Amorphic Diamond™ Coating", Schmidt Instruments, Inc., (Mar. 20, 1992).

Product Brochure "Enhanced Performance for Electronic And Optical Products" Diamonex Diamonds Coatings (ca. 1991).

Product Brochure "Polycrystalline Diamond Heat Spreaders", Diamonex Diamond (ca. 1991) Coatings.

"News About Diamond Film and Norton Diamatorr Products" Diamond Directions, vol. 1, No. 1, (1991).

F. Okuzumi et al., "New Group of Tools With Thick Diamond Film Made by Chemical Vapor Deposition", pp. 15–1–15–14 (ca. 1991).

EARTH-BORING BIT WITH IMPROVED RIGID FACE SEAL

BACKGROUND OF THE INVENTION

1. Cross-Reference to Related Applications

This is a continuation of application Ser. No. 08/620,639, filed Mar. 22, 1996 now abandoned, which application is a continuation-in-part of application Ser. No. 08/390,897, filed Feb. 15, 1995, abandoned, which is a continuation of application Ser. No. 08/048,863, filed Apr. 16, 1993, abandoned.

2. Field of the Invention

The present invention relates generally to earth-boring bits, especially the seal and lubrication systems for earth-boring bits of the rolling cutter variety. More particularly, the present invention relates to improving the wear-resistance and to reducing friction in the seal systems of such earth-boring bits.

3. Background Information

The success of rotary drilling enabled the discovery of deep oil and gas reservoirs. The rotary rock bit was an important invention that made the success of rotary drilling possible. Only soft earthen formations could be penetrated commercially with the earlier drag bit, but the two-cone rock bit, invented by Howard R. Hughes, U.S. Pat. No. 930,759, drilled the hard cap rock at the Spindletop Field, near Beaumont, Tex. with relative ease. That venerable invention, within the first decade of this century, could drill a scant fraction of the depth and speed of the modern rotary rock bit. If the original Hughes bit drilled for hours, the modern bit drills for days. Modern bits sometimes drill for thousands of feet instead of merely a few feet. Many advances have contributed to the impressive improvement of earth-boring bits of the rolling cutter variety.

In drilling boreholes in earthen formations by the rotary method, earth-boring bits typically employ at least one rolling cone cutter, rotatably mounted thereon. The bit is secured to the lower end of a drillstring that is rotated from the surface or by downhole motors. The cutters mounted on the bit roll and slide upon the bottom of the borehole as the drillstring is rotated, thereby engaging and disintegrating the formation material. The rolling cutters are provided with teeth that are forced to penetrate and gouge the bottom of the borehole by weight from the drillstring.

As the cutters roll and slide along the bottom of the borehole, the cutters, and the shafts on which they are rotatably mounted, are subjected to large static loads from the weight on the bit, and large transient or shock loads encountered as the cutters roll and slide along the uneven surface of the bottom of the borehole. Thus, most earth-boring bits are provided with precision-formed journal bearings and bearing surfaces, as well as sealed lubrication systems to increase drilling life of bits. The lubrication systems typically are sealed to avoid lubricant loss and to prevent contamination of the bearings by foreign matter such as abrasive particles encountered in the borehole. A pressure compensator system minimizes pressure differential across the seal so that lubricant pressure is equal to or slightly greater than the hydrostatic pressure in the annular space between the bit and the sidewall of the borehole.

Early Hughes bits had no seals or rudimentary seals with relatively short life, and, if lubricated at all, necessitated large quantities of lubricant and large lubricant reservoirs. Typically, upon exhaustion of the lubricant, journal bearing and bit failure soon followed. An advance in seal technology occurred with the "Belleville" seal, as disclosed in U.S. Pat. No. 3,075,781, to Atkinson et al. The Belleville seal minimized lubricant leakage and permitted smaller lubricant reservoirs to obtain acceptable bit life.

During the quest for improved journal bearing seals, bits employing anti-friction ball or roller bearing elements rose to prominence in bit technology. Roller bearing elements reduce the importance of lubricants and lubrication systems, but introduce a number of other disadvantages. A principal disadvantage is that a failure of any one of the numerous elements likely would permit metallic particles to enter the bearing with almost certain damaging results.

An adequately sealed journal-bearing bit should have greater strength and load-bearing capacity than an anti-friction bearing bit. The seal disclosed by Atkinson would not seal lubricant inside a journal-bearing bit for greater than about 50–60 hours of drilling, on average. This was partially due to rapid movement of the cutter on its bearing shaft (cutter wobble), necessitated by bearing and assembly tolerances, which causes dynamic pressure surges in the lubricant, forcing lubricant past the seal, resulting in premature lubricant loss and bit failure.

The O-ring, journal bearing combination disclosed in U.S. Pat. No. 3,397,928, to Galle unlocked the potential of the journal-bearing bit. Galle's O-ring-sealed, journal-bearing bit could drill one hundred hours or more in the hard, slow drilling of West Texas. The success of Galle's design was in part attributable to the ability of the O-ring design to help minimize the aforementioned dynamic pressure surges.

A major advance in earth-boring bit seal technology occurred with the introduction of a successful rigid face seal. The rigid face seals used in earth-boring bits are improvements upon a seal design known as the "Duo-Cone" seal, developed by Caterpillar Tractor Co. of Peoria, Ill. Rigid face seals are known in several configurations, but typically comprise at least one rigid ring, having a precision seal face ground or lapped thereon, confined in a groove near the base of the shaft on which the cutter is rotated, and an energizer member, which urges the seal face of the rigid ring into sealing engagement with a second seal face. Thus, the seal faces mate and rotate relative to each other to provide a sealing interface between the rolling cutter and the shaft on which it is mounted.

The combination of the energizer member and rigid ring permits the seal assembly to move slightly to minimize pressure fluctuations in the lubricant, and to prevent extrusion of the energizer past the cutter and bearing shaft, which can result in sudden and almost total lubricant loss. U.S. Pat. Nos. 4,516,641, to Burr; 4,666,001, to Burr; 4,753,304, to Kelly; and 4,923,020 to Kelly, are examples of rigid face seals for use in earth-boring bits. Rigid face seals substantially improve the drilling life of earth-boring bits of the rolling cutter variety. Earth-boring bits with rigid face seals frequently retain lubricant and thus operate efficiently longer than prior-art bits.

Because the seal faces of rigid face seals are in constant contact and slide relative to each other, the dominant mode of failure of the seals is wear. Eventually, the seal faces become pitted and the coefficient of friction between the seal faces increases, leading to increased operating temperatures, reduction in seal efficiency, and eventual seal failure, which ultimately result in bit failure. In an effort to minimize seal wear, seal rings of prior-art rigid face seals are constructed of tool steels such as 440C stainless, or hardenable alloys such as Stellite. Use of these materials in rigid face seals lengthens the drilling life of bits, but leaves room for improvement of the drilling longevity of rigid face seals, and thus earth-boring bits.

A need exists, therefore, for a rigid face seal for use in earth-boring bits having improved wear-resistance and reduced coefficients of sliding friction between the seal faces.

SUMMARY OF THE INVENTION

It is a general object of the present invention to provide an improved rigid face seal for use in an earth-boring bit, the rigid face seal having improved wear-resistance and reduced coefficients of sliding friction between the seal faces thereof.

This and other objects of the present invention are accomplished by providing an earth-boring bit having a bit body, at least one cantilevered bearing shaft, including a cylindrical journal bearing surface extending inwardly and downwardly from the bit body, and at least one cutter mounted for rotation on the cylindrical journal bearing surface of the bearing shaft. A seal assembly is disposed between the cylindrical journal bearing surface and the cutter proximally to the base of the cantilevered bearing shaft. The seal assembly includes at least one rigid seal ring formed of a metal selected from the group consisting of iron and cobalt and alloys thereof, the seal ring having a seal face in contact with a second seal face. At least one of the seal faces is at least partially formed of a super-hard material having wear-resistance greater than, and a coefficient of sliding friction less than, the material of the rigid seal ring, the super-hard material secured to the seal face at a temperature less than the lowest transformation temperature of the metal of the seal ring.

According to the preferred embodiment of the present invention, the second seal face is a radial seal face on a second rigid seal ring and at least the second seal face portion of the second rigid seal ring is at least partially formed of a super-hard material.

According to one embodiment of the present invention, the second seal face is carried by the cutter of the earth-boring bit and the second seal face is formed of a super-hard material.

One preferred super-hard material is amorphic diamond, which has wear-resistance greater than, and a coefficient of sliding friction less than, that of the material of the rigid seal ring.

Another preferred super-hard material is polycrystalline diamond, formed separately from the seal ring and adhered to the seal face of the seal ring by soldering, low-temperature brazing, or adhesive.

Other objects, features, and advantages of the present invention will be apparent to those skilled in the art with reference to the figures and detailed description, which follow.

DESCRIPTION OF THE PREFERRED EMBODIMENT

Figure 1:
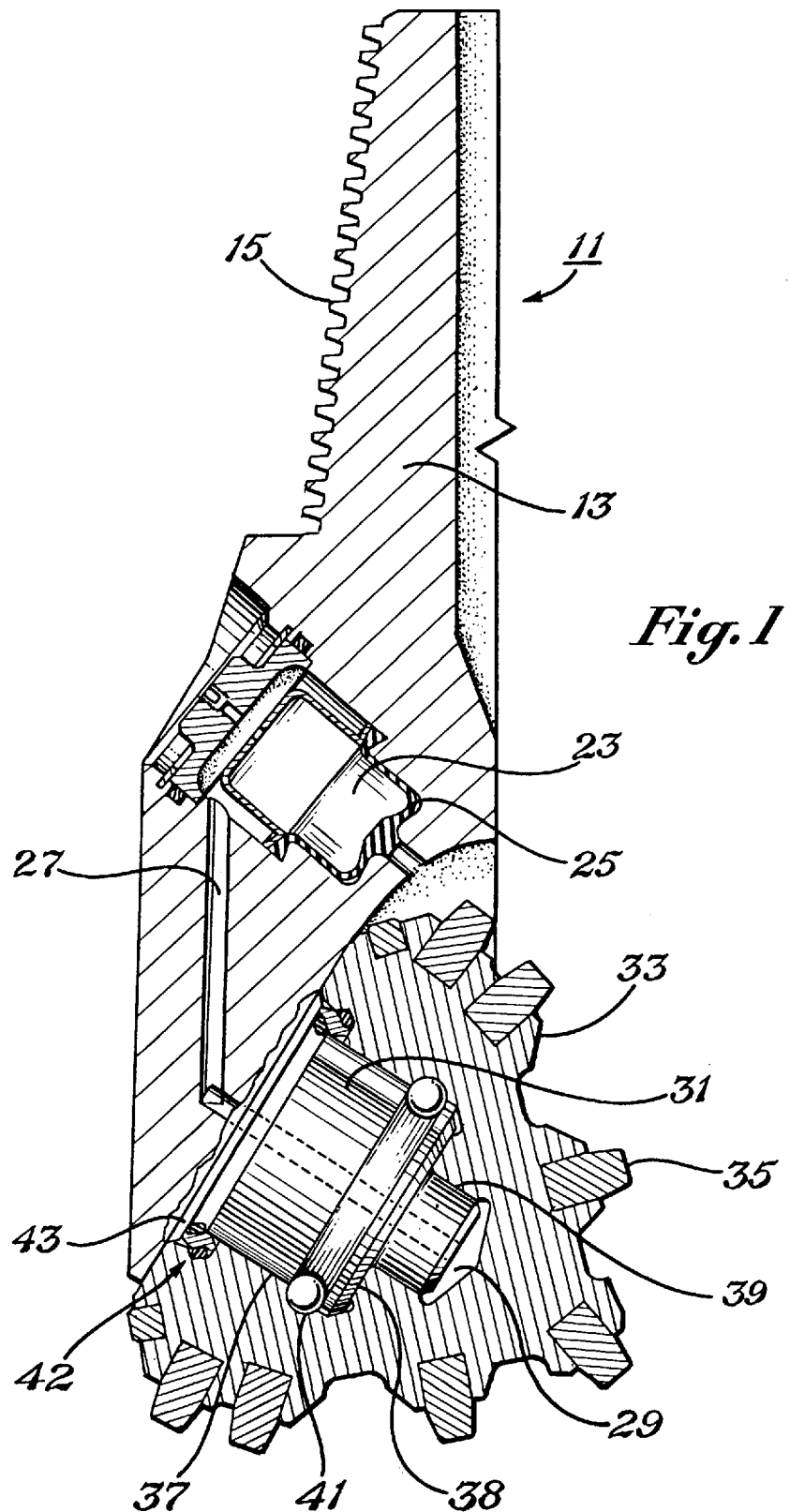
FIG. 1 is a fragmentary section view of a section of an earth-boring bit according to the present invention.

FIG. 1 depicts, in a fragmentary section view, one section of an earth-boring bit 11 according to the present invention. Earth-boring bit 11 is provided with a body 13, which is threaded at its upper extent 15 for connection into a drill-string (not shown).

Earth-boring bit 11 is provided with a pressure compensating lubrication system 23. Pressure compensating lubrication system 23 is vacuum pressure filled with lubricant at assembly. The vacuum pressure lubrication process also ensures that the journal bearing cavity generally designated as 29 is filled with lubricant through passage 27. Ambient borehole pressure acts through diaphragm 25 to cause lubricant pressure to be substantially the same as ambient borehole pressure.

A cantilevered bearing shaft 31 depends inwardly and downwardly from body 13 of earth-boring bit 11. A generally frusto-conical cutter 33 is rotatably mounted on cantilevered bearing shaft 31. Cutter 33 is provided with a plurality of generally circumferential rows of inserts or teeth 35, which engage and disintegrate formation material as earth-boring bit 11 is rotated and cutters 33 roll and slide along the bottom of the borehole.

Cantilevered bearing shaft 31 is provided with a cylindrical bearing surface 37, a thrust bearing surface 38, and a pilot pin bearing surface 39. These surfaces 37, 38, 39 cooperate with mating bearing surfaces on cutter 33 to form a journal bearing on cantilevered bearing shaft 31 on which cutter 33 may rotate freely. Lubricant is supplied to journal bearing through passage 27 by pressure-compensating lubricant system 23. Cutter 33 is retained on bearing shaft 31 by means of a plurality of precision-ground ball locking members 41.

A seal assembly 42 according to the present invention is disposed proximally to a base 43 of cantilevered bearing shaft 31 and generally intermediate cutter 33 and bearing shaft 31. This seal assembly is provided to retain the lubricant within bearing cavity 29, and to prevent contamination of lubricant by foreign matter from the exterior of bit 11. The seal assembly may cooperate with pressure-compensating lubricant system 23 to minimize pressure differentials across seal 42, which can result in rapid extrusion of and loss of the lubricant, as disclosed in U.S. Pat. No. 4,516,641, to Burr. Thus, pressure compensator 23 compensates the lubricant pressure for hydrostatic pressure changes encountered by bit 11, while seal assembly 42 compensates for dynamic pressure changes in the lubricant caused by movement of cutter 33 on shaft 31.

Figure 2:
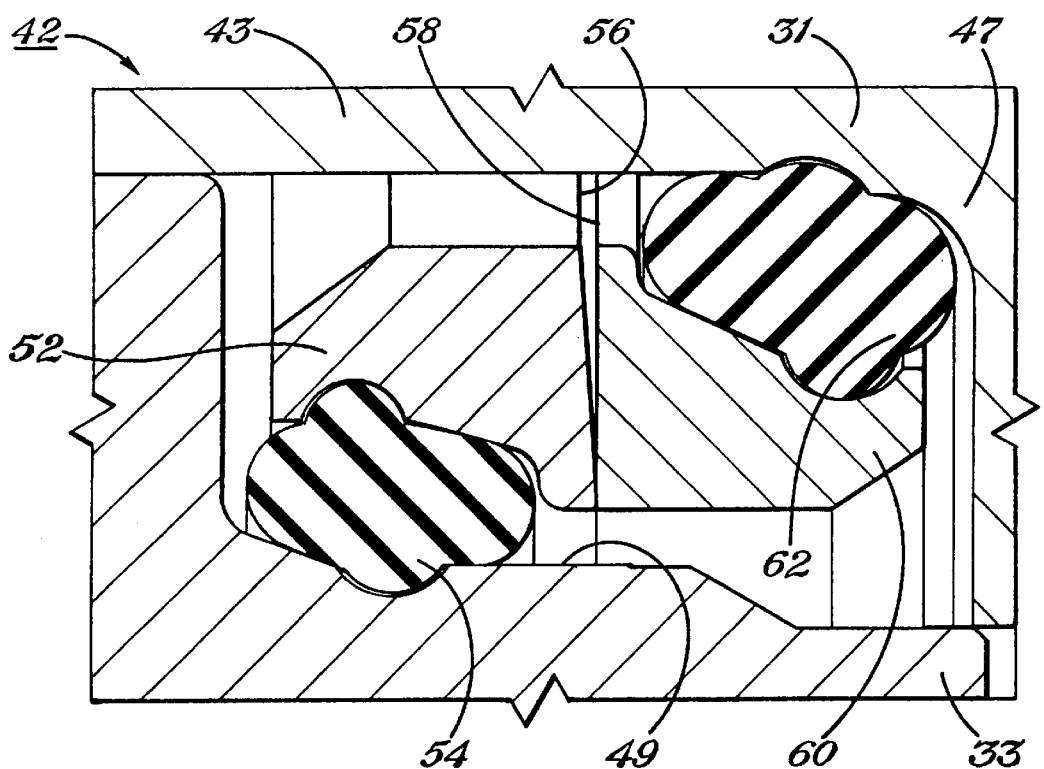
FIG. 2 is an enlarged, fragmentary section view of the preferred seal assembly for use with earth-boring bits according to the present invention.

FIG. 2 depicts, an enlarged section view, a preferred seal configuration 42 contemplated for use with the present invention. Seal assembly 42 illustrated is known as a "dual" rigid face seal because it employs two rigid seal rings, as opposed to the single-ring configuration illustrated in FIG. 3. Dual rigid face seal assembly 42 is disposed proximally to base 43 of bearing shaft 31 and is generally intermediate cutter 33 and shaft 31. Seal assembly 42 is disposed in a seal groove defined by shaft groove 47 and cutter groove 49. Dual rigid face seal assembly 42 comprises a cutter rigid ring 52, a cutter resilient energizer ring 54, shaft rigid ring seal ring 60, and shaft resilient energizer ring 62. Cutter rigid seal ring 52 and shaft rigid seal ring 60 are provided with precision-formed radial seal faces 56, 58, respectively. Resilient energizer rings 54, 62 cooperate with seal grooves 47, 49 and rigid seal rings 52, 60 to urge and maintain radial seal faces 56, 58 in sealing engagement. The seal interface formed by seal faces 56, 58 provides a barrier that prevents lubricant from exiting the journal bearing, and prevents contamination of the lubricant by foreign matter from exterior of bit 11.

According to the preferred embodiment of the present invention, at least a portion of seal faces 56, 58 of rigid seal rings 52, 60 is formed of a super-hard material having a coefficient of sliding friction lower than the material of rigid seal rings 52, 60. Preferably, the entirety of both seal faces 56, 58 is formed of super-hard material. This super-hard material reduces wear on seal faces 56, 58, thereby enhancing the life of seal assembly 42 and reducing friction between seal faces 56, 58, which can degrade seal function. Exemplary dimensions for the seal illustrated in FIG. 2 may be found in U.S. Pat. No. 4,516,641 to Burr.

Figure 3:
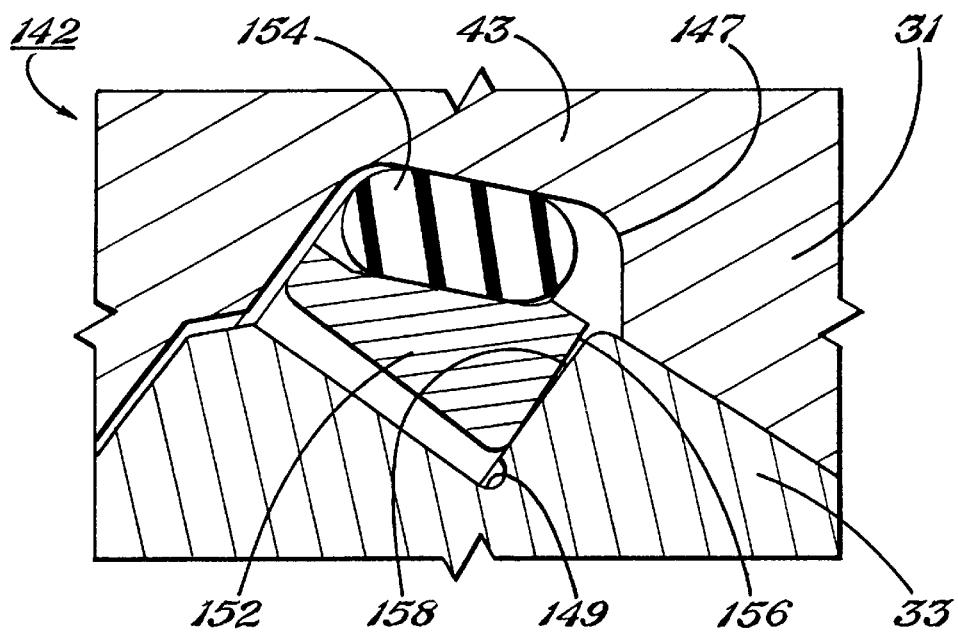
FIG. 3 is an enlarged, fragmentary section view of an alternative seal assembly contemplated for use with the present invention.

FIG. 3 illustrates, in enlarged section view, an alternative seal configuration 142. Seal assembly 142 comprises shaft seal groove 147, cutter seal groove 149, rigid seal ring 152, and resilient energizer ring 154. A precision-formed radial seal face 156 is formed on rigid seal ring 152, and mates with a corresponding precision-formed seal face 158 carried by cutter 33. Seal face 158 is formed on a bearing sleeve 160 interference fit in cutter 33. Resilient energizer ring 154 cooperates with shaft seal groove 147 and rigid seal ring 152 to urge and maintain seal faces 156, 158 in sealing engagement.

At least a portion, and preferably the entirety, of seal faces 156, 158 of seal assembly 142 is formed of super-hard material having a coefficient sliding friction less than that of the material of rigid seal ring 152. Exemplary dimensions for the seal assembly depicted in FIG. 3 may be found in U.S. Pat. No. 4,753,304 to Kelly.

The seal assemblies depicted in FIGS. 1, 2, and 3 are representative of rigid face seal technology and are shown for illustrative purposes only. The utility of the present invention is not limited to the seal assemblies illustrated, but is useful in all manner of rigid face seals.

Super-hard materials (as the term is used herein) are among the hardest known to man and include natural diamond, synthetic diamond, polycrystalline diamond, cubic boron nitride, thick and thin-film diamond, and thin-film diamond-like carbon. These materials have hardnesses in the vicinity of 5000 and upward on the Knoop scale and are to be distinguished from ceramics such as silicon carbide, tungsten carbide, aluminum oxide, and the like, which have hardnesses of less than 3000 on the Knoop scale. In addition to their hardness and resulting wear resistance, super-hard materials, particularly the diamond variants, have generally good-to-excellent properties in sliding friction and heat dissipation, especially acting as a friction pair.

Nevertheless, it has been difficult in the past to form diamond or super-hard coatings or films on metallic substrates, the difficulty arising primarily from a lack of adhesion to the substrate. In addition to the lack of adhesion, most coating or deposition processes involve high temperatures and slow deposition rates. The temperatures involved in conventional vapor deposition processes generally are in the range of 800–1000° C. and upward.

The iron and cobalt-based alloys of which rigid face seal rings are constructed (440C stainless steel and Stellite being examples) have lowest transformation temperatures of approximately 730° C. and 420° C., respectively. Thus, an attempt to coat these seal rings with a super-hard material using conventional high-temperature vapor deposition processes would result in warpage and/or annealing of the rings, an unacceptable result for the precision-formed seal rings.

One particular type of diamond-like carbon has proved to be successful in adhering to metallic substrates. This material is available under the name amorphic diamond from SI Diamond Technology, Inc., of Houston, Tex. This material, and the formation process thereof, is fully described in U.S. Pat. Nos. 4,987,007, Jan. 22, 1991, to Wagal et al., and 5,098,737, Mar. 24, 1992, to Collins et al. The process for formation for amorphic diamond coatings involves extracting ions from a laser ablation plume in a vacuum environment at room temperature and accelerating the ions through a grid for deposit on the substrate. Although the apparatus for formation of amorphic diamond is expensive, it provides for the formation of a coating on a substrate material that occurs at a relatively high and economical rate, and produces a coating that adheres well to the substrate material and possesses generally good and uniform mechanical properties, without detrimental phase transition of the substrate seal ring alloy.

Another preferred method by which a super-hard coating or film can be formed on a metallic substrate such as the seal rings of a rigid face seal is to grow or deposit a polycrystalline diamond film on a substrate, remove the substrate and secure the film to the seal ring using an appropriate adhesive such as epoxy or other high-strength adhesive appropriate to the downhole environment or low-temperature brazing or soldering alloy.

The film is deposited from a carbon-containing vapor or plasma onto a silicon (or similar, inert, high-melting temperature material) substrate having a highly polished surface and a shape conforming to the seal face of the seal ring. The substrate is etched away or otherwise removed, leaving a diamond film conforming to the seal face of the seal ring and having a highly polished surface where the diamond was adjacent the substrate and a rougher side opposite the polished surface.

Other similar processes for obtaining such a free-standing diamond film or sheet are found is U.S. Pat. Nos. 5,264,071 and 5,349,922, to Anthony et al. and assigned to General Electric Co. and 5,314,652 to Simpson et al. and assigned to Norton Company. In these references, the diamond is deposited upon a molybdenum substrate, and upon cooling, releases from the substrate due to the differential in rates of thermal expansion between the two materials.

Presently, these free-standing diamond films can be obtained in thicknesses between approximately 0.010 and 0.020 inch, with a thickness of 0.015 inch being preferred for the present application as a good balance between strength and cost.

The diamond film then is secured to the seal face of the seal ring using either a high-strength adhesive or by brazing or soldering using an alloy having a melting temperature less than the lowest transformation temperature of the metal alloy of the seal ring. If brazing or soldering is used, a layer of tungsten, nickel, or copper can be deposited on the rough side of the film to enhance metallurgical bonding between the brazing or soldering alloy and the film. Thus, the highly polished surface of the film provides a seal face formed of super-hard material.

Both of these processes yield seal rings having super-hard seal faces with good wear, friction, and heat dissipation characteristics, yet can be formed at temperatures that will not warp, anneal, or otherwise deform the precision-formed seal rings.

Figure 4:
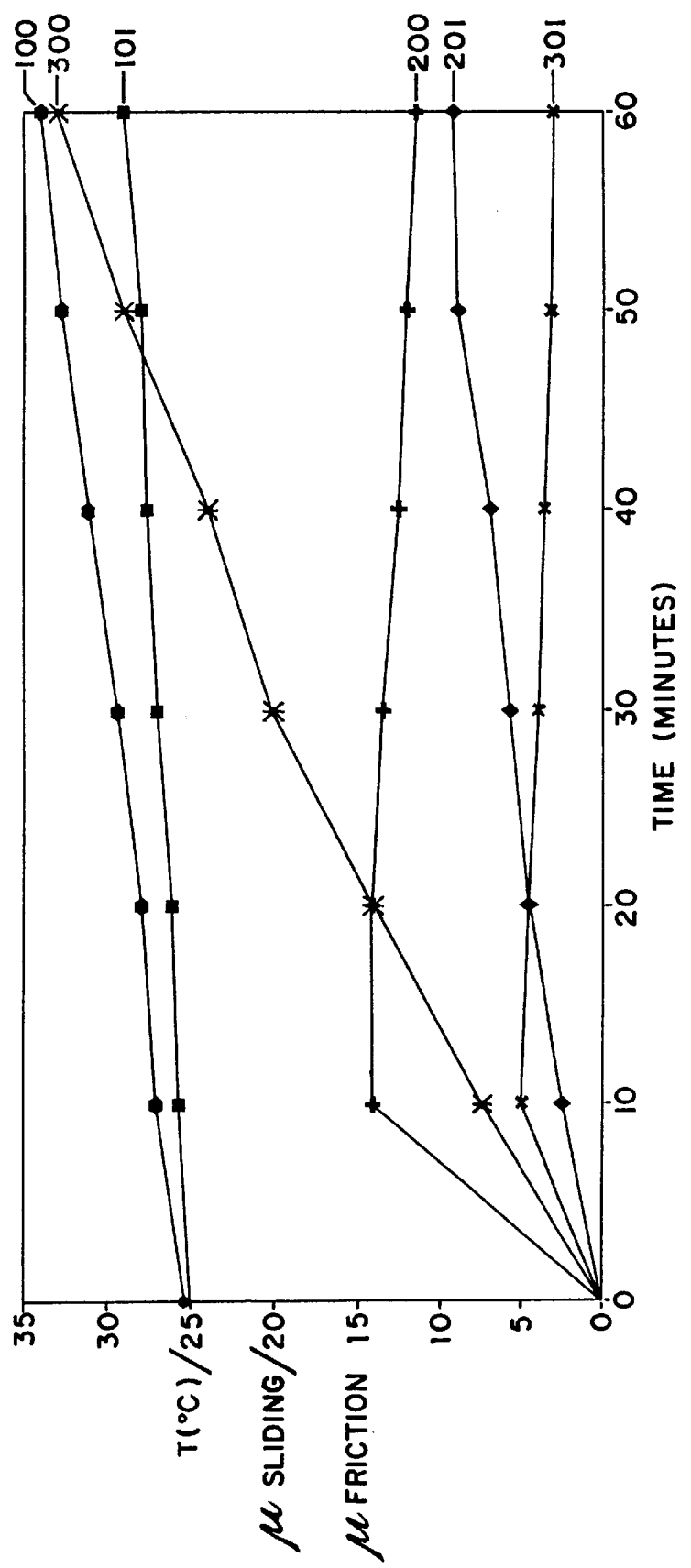
FIG. 4 is a graphical comparison of the results of a test of friction pairs of material coated according to the present invention versus conventional material.

FIG. 4 is a graph comparing operating temperature (T), coefficient of sliding friction ($\mu_{sliding}$), and friction force ($F_{friction}$) for a friction pair of conventional material versus a friction pair coated with super-hard material according to the present invention. The test forming the basis for the graph of FIG. 4 was conducted pursuant to A.S.T.M. D-2714, and comprised rotating both a conventional, uncoated test ring and a test ring having a coating according to the present invention on a test block of the same respective material (see below) at 196 revolutions per minute for 60 minutes, resulting in 11,760 cycles.

The conventional test ring and block were formed of 440C stainless steel hardened to approximately 52 or higher on the Rockwell C scale. The test ring and block according to the present invention were similarly formed, but were provided with a thin-film ($\leq 1$ micron thickness) coating of the amorphic diamond super-hard material.

The test was conducted with 100 milliliters of test lubrication fluid prescribed by the aforementioned A.S.T.M. D-2714 test parameter. The following data was obtained by measuring the aforementioned properties at various time intervals during the test:

| Time (Min) | Temp (° C.) | Coefficient of Friction | Friction Force (lbf) |
| --- | --- | --- | --- |
| Prior Art | | | |
| 0 | 25.0 | 0 | 0 |
| 10 | 27.0 | .140 | 0.7 |
| 20 | 28.0 | .140 | 1.4 |
| 30 | 29.7 | .133 | 2.0 |
| 40 | 31.0 | .120 | 2.4 |
| 50 | 32.6 | .116 | 2.9 |
| 60 | 34.0 | .110 | 3.3 |
| Present Invention | | | |
| 0 | 24.5 | 0 | 0 |
| 10 | 25.5 | .05 | .25 |
| 20 | 26.0 | .045 | .45 |
| 30 | 27.0 | .037 | .55 |
| 40 | 27.6 | .033 | .65 |
| 50 | 28.0 | .030 | .85 |
| 60 | 29.0 | .028 | .85 |

FIG. 4 is a graphical representation of this data for comparison purposes. For this graphical representation, the coefficient of friction values ($\mu_{sliding}$) were multiplied by a factor of 100 and the frictional force values ($F_{friction}$) were multiplied by a factor of 10. Graphed lines 100 and 101 represent the operating temperatures of the conventional friction pair and the friction pair according to the present invention, respectively. Graphed lines 200 and 201 represent the measured frictional force (multiplied by a factor of 10) for the conventional friction pair and the friction pair according to the present invention, respectively. Graphed lines 300 and 301 represent the measured coefficient of sliding friction of the conventional friction pair and the friction pair according to the present invention, respectively. As is demonstrated in FIG. 4, the friction pair according to the present invention operates at a lower temperature, with a lower frictional force, and with a lower coefficient of sliding friction than the conventional friction pair.

In operation, earth-boring bit 11 is attached to a drillstring (not shown) and run into a borehole for drilling operation. The drillstring and earth-boring bit 11 are rotated, permitting cutters 33 to roll and slide along the bottom of the borehole, wherein inserts or teeth 35 engage and disintegrate formation material. While cutters 33 rotate relative to body 13 of earth-boring bit 11, seal assemblies retain lubricant in bearing cavities 29, promoting the free rotatability of cutters 33 on bearing shafts 31.

Resilient energizer rings 54, 62, 154 maintain rigid seal rings 52, 60, 152 and seal faces 56, 58, 156, 158 in sealing engagement. Seal faces 56, 158 associated with cutter 33 rotate relative to seal faces 58, 156 associated with bearing shaft 31, which remain essentially stationary. Thus, seal faces 56, 58, 156, 158 are in constant sliding contact, and are subject to abrasive and frictional wear.

Rigid face seals having seal faces formed according to the present invention provide increased wear-resistance, lower coefficients of sliding friction therebetween, and a lower operating temperature over prior-art rigid face seals. These factors combined provide a seal assembly, and thus an earth-boring bit, having longer operational life. The ability of the seal assembly to withstand wear and operate longer than prior-art seals permits retention of lubricant in the bearing surfaces for longer periods of time, thus resulting in an earth-boring bit having increased life and therefore more economical operation.

The present invention has been described with reference to a preferred embodiment thereof. Those skilled in the art will appreciate that the invention is thus not limited, but is susceptible to variation and modification without departure from the scope and spirit thereof.

I claim:

1. A method for constructing an earth-boring bit with an improved face seal assembly, comprising:

providing a bit body with at least one cantilevered bearing shaft which has a base and extends inwardly and downwardly from the bit body;

providing a seal assembly by forming at least one rigid seal ring of a hardened metal selected from the group consisting of iron, cobalt and alloys thereof, the hardened metal having a lowest transformation temperature at which the hardened metal at least partially loses its properties as a hardened metal, securing on the rigid seal ring a seal face which is at least partially formed of a super-hard material having a hardness of upward of 5000 on the Knoop scale, wherein the step of securing the super-hard material to the rigid seal ring is performed at a temperature lower than the lowest transformation temperature of the metal of the rigid seal ring, and positioning the seal face of the rigid seal ring in contact with a second seal face;

mounting the seal assembly on the bearing shaft proximal to the base of the bearing shaft; and mounting a cutter on the bearing shaft for rotation and in engagement with the seal assembly.

2. The method according to claim 1 wherein the step of securing on the rigid seal ring a seal face comprises coating on the rigid seal ring amorphic diamond in an amorphic diamond process by extracting ions from a laser ablation plume in a vacuum environment at room temperature and accelerating the ions through a grid.

3. The method according to claim 1, wherein the step of securing on the rigid seal ring a seal face comprises forming a diamond layer on a substrate, removing the substrate from the diamond layer, and attaching the diamond layer to the rigid seal ring by an adhesive.

4. The method according to claim 1, wherein the step of securing on the rigid seal ring a seal face comprises forming a free-standing diamond layer on a substrate, removing the substrate from the diamond layer, and brazing the diamond layer to the rigid seal ring.

5. The method according to claim 1, wherein the step of positioning the seal face of the rigid seal ring in contact with a second seal face comprises providing a second rigid seal ring of a hardened metal selected from the group consisting of iron, cobalt and alloys thereof, securing to the second rigid seal ring a seal face which is at least partially formed of a super-hard material having a hardness of upward of 5000 on the Knoop scale, and wherein the step of securing the super-hard material to the second rigid seal ring is performed at a temperature lower than a lowest transformation temperature of the metal of the second rigid seal ring.

6. The method according to claim 1, wherein the step of positioning the seal face of the rigid seal ring in contact with a second seal face comprises at least partially forming the second face of a super-hard material having a hardness of upward of 5000 on the Knoop scale.

7. The method according to claim 1, wherein the step of securing on the rigid seal ring a seal face comprises forming the seal face entirely of a super-hard material having a hardness of upward of 5000 on the Knoop scale.

8. A method for constructing an earth-boring bit with an improved seal assembly, comprising:

(a) providing a bit body with at least one cantilevered bearing shaft which has a base and extends inwardly and downwardly from the bit body;

(b) forming at least one rigid seal ring of a hardened metal selected from the group consisting of iron, cobalt and alloys thereof, the hardened metal having a lowest transformation temperature at which the hardened metal at least partially loses its properties as a hardened metal;

(c) forming a free-standing layer of a super-hard material which has a hardness of upwards of 5000 on the Knoop scale; then (d) securing the layer of super-hard material to the rigid seal ring while at a temperature less than the lowest transformation temperature, thereby forming a seal face; then (e) mounting the rigid seal ring on the bearing shaft proximal to the base of the bearing shaft and positioning the seal face of the rigid seal ring in contact with a second seal face; and (f) mounting a cutter on the bearing shaft for rotation, the cutter having an interior sealed by the seal faces.

9. The method according to claim 8, wherein step (d) comprises securing the layer of super-hard material with an adhesive.

10. The method according to claim 8, wherein step (d) comprises brazing the layer of super-hard material to the rigid seal ring.

11. The method according to claim 8, wherein step (d) comprises soldering the layer of super-hard material to the rigid seal ring.

12. The method according to claim 8, wherein step (c) comprises forming the layer of super-hard material on a substrate and separating the substrate from the layer prior to step (d).

13. The method according to claim 8, wherein step (e) comprises:

providing a second rigid seal ring of a hardened metal selected from the group consisting of iron, cobalt and alloys thereof, the hardened metal of the second rigid seal ring having a lowest transformation temperature at which the hardened metal at least partially loses its properties as a hardened metal, forming a second free-standing layer of super-hard material having a hardness of upward of 5000 on the Knoop scale, and securing the second free-standing layer of super-hard material to the second rigid seal ring while at a temperature lower than the lowest transformation temperature of the metal of the second rigid seal ring, the second free-standing layer being the second seal face.

14. A method for constructing an earth-boring bit with an improved seal assembly, comprising:

(a) providing a bit body with at least one cantilevered bearing shaft which has a base and extends inwardly and downwardly from the bit body;

(b) forming two rigid seal rings of a hardened metal selected from the group consisting of iron, cobalt and alloys thereof;

(c) forming seal faces on the rigid seal rings by coating amorphic diamond in an amorphic diamond process by extracting ions from a laser ablation plume in a vacuum environment at room temperature and accelerating the ions through a grid;

(d) mounting the rigid seal rings on the bearing shaft proximal to the base of the bearing shaft and positioning the seal faces in contact with each other; and (e) mounting a cutter on the bearing shaft for rotation, the cutter having an interior sealed by the seal faces.

* * * * *